(12) United States Patent
Forte et al.

(10) Patent No.: US 10,439,884 B1
(45) Date of Patent: Oct. 8, 2019

(54) CYBERSECURITY INCIDENT RESPONSE AND SECURITY OPERATION SYSTEM EMPLOYING PLAYBOOK GENERATION THROUGH CUSTOM MACHINE LEARNING

(71) Applicant: DFLabs S.p.A., Milan (IT)

(72) Inventors: Dario Valentino Forte, Torre de' Picenardi (IT); Michele Zambelli, Cremona (IT); Vojtech Letal, Pardubice (CZ)

(73) Assignee: DFLABS S.P.A., Milan (IT)

( * ) Notice: Subject to any disclaimer, the term of this patent is extended or adjusted under 35 U.S.C. 154(b) by 208 days.

(21) Appl. No.: 15/620,439

(22) Filed: Jun. 12, 2017

Related U.S. Application Data

(60) Provisional application No. 62/490,817, filed on Apr. 27, 2017.

(51) Int. Cl.
| | |
|---|---|
| *H04L 12/24* | (2006.01) |
| *G06F 21/62* | (2013.01) |
| *H04L 29/06* | (2006.01) |
| *G06F 3/0482* | (2013.01) |

(52) U.S. Cl.
CPC .............. *H04L 41/12* (2013.01); *G06F 21/62* (2013.01); *H04L 41/0654* (2013.01); *H04L 63/061* (2013.01); *H04L 63/20* (2013.01); *G06F 3/0482* (2013.01); *H04L 41/22* (2013.01)

(58) Field of Classification Search
None
See application file for complete search history.

(56) References Cited

U.S. PATENT DOCUMENTS

| | | | | |
|---|---|---|---|---|
| 9,306,966 | B2* | 4/2016 | Eskin | G06F 16/84 |
| 9,386,041 | B2* | 7/2016 | Carver | H04L 63/1441 |
| 9,609,009 | B2* | 3/2017 | Muddu | G06F 16/254 |

(Continued)

OTHER PUBLICATIONS

Keller et al.,"A fuzzy k-nearest neighbor algorithm," IEEE transactions on systems, man, and cybernetics, pp. 580-585, vol. SMC-15, No. 4, (Jul./Aug. 1985).

(Continued)

*Primary Examiner* — Fatoumata Traore
(74) *Attorney, Agent, or Firm* — Browdy and Neimark, P.L.L.C.

(57) ABSTRACT

A new cybersecurity incident is registered at a security incident response platform. At a playbook generation system, details are received of the new cybersecurity incident from the security incident response platform. At least some of the details correspond to a set of features of the new cybersecurity incident. A set or subset of nearest neighbors of the new cybersecurity incident is localized in a feature space. The nearest neighbors of the new cybersecurity incident are other cybersecurity incidents having a distance from the new cybersecurity incident within the feature space that is defined by differences in features of the nearest neighbors with respect to the set of features of the new cybersecurity incident. A custom playbook is created for responding to the new cybersecurity incident having prescriptive procedures based on occurrences of prescriptive procedures previously employed in response to the nearest neighbor cybersecurity incidents.

24 Claims, 11 Drawing Sheets

(56) References Cited

U.S. PATENT DOCUMENTS

2008/0098219 A1   4/2008  Forte
2016/0044061 A1   2/2016  Forte

OTHER PUBLICATIONS

Enright, "Using a "Playbook" Model to Organize Your Information Security Monitoring Strategy", Cisco Blog, blogs.cisco.com/security/using-a-playbook-model-to-organize-your-information-security-monitoring-strategy, (Nov. 1, 2013).
Enright, "Using a "Playbook" Model to Organize Your Information Security Monitoring Strategy", Cisco Blog, blogs.cisco.com/security/using-a-playbook-model-to-organize-your-information-security-monitoring-strategy, (Nov. 1, 2013), downloaded Jun. 12, 2017.

\* cited by examiner

| Type | Feature | Encoding |
|---|---|---|
| TEXT | None | |
| ENUM | Enum | One Hot |
| CHECKBOX | Boolean | Boolean |
| DATE | None | |
| DATE_TIME | None | |
| TIMEZONE | Enum | One Hot |
| TAGS | EnumSet | Many Hot |
| DYNAMIC | None | |
| LINK | None | |
| COLOR | None | |
| LDAP | None | |
| MULTI_SELECT_LIST | enum | Many Hot |
| IP | Present | Boolean |
| CALCULATION | None | |
| HASH | Present | Boolean |
| EMAIL | Present | Boolean |
| URL | Present | Boolean |
| FILENAME | Present | Boolean |
| USER_DETAILS | None | |

CYBERSECURITY INCIDENT RESPONSE AND SECURITY OPERATION SYSTEM EMPLOYING PLAYBOOK GENERATION THROUGH CUSTOM MACHINE LEARNING

CROSS-REFERENCE TO RELATED APPLICATION

This patent application claims the benefit of U.S. provisional patent application Ser. No. 62/490,817, filed Apr. 27, 2017, which is hereby incorporated herein by reference.

TECHNICAL FIELD

The field of this invention generally relates to cybersecurity incident response and security operation systems, and more particularly to such systems employing playbooks containing sets of "plays" or prescriptive procedures for responding to cybersecurity incidents.

BACKGROUND

Certain cybersecurity incident response and security operation systems, such as the IncMan incident response platform available from DFLabs, incorporate the use of playbooks to assist a user in responding to a cybersecurity incident.

Playbooks are collections of manual and automated actions designed to resolve an incident or complete an investigation. For example, in the IncMan platform, sets of predefined playbooks can be provided based on different industry standards. Each incident is categorized according to one or more type values, and these type values are used to match related playbooks to an incident. Each playbook is described by some properties including type, category and actions that can be grouped in subcategories. Multiple playbooks can be linked to the same incident. Actions to be assigned to users can be defined into a playbook. Additionally, automatic actions for enrichment containment and notification of the incident can be assigned as part of each playbook.

In the IncMan platform, the user can select from a number of pre-constructed playbooks and later customize the playbooks. The playbooks are proposed based only on the type of the incident in a log record (so no other incident fields of the log record are taken into account) and any subsequent user customization (i.e., addition and removal of actions) is not taken into account in the proposing of pre-constructed playbooks.

Previous patent applications by the inventor of the present application pertaining to cybersecurity incident response systems and digital evidence control systems include U.S. patent application Ser. No. 11/784,794, filed Apr. 10, 2007 and published as U.S. Patent Publication 2008/0098219, and U.S. patent application Ser. No. 14/521,328, filed Oct. 22, 2014 and published as U.S. Patent Publication 2016/0044061. The entire disclosure of both of these previous patent applications by the inventor of the present application is hereby incorporated herein by reference. It is contemplated that the system described herein may be used in connection with cybersecurity incident response and security operation systems employing the subject matter described in the above-referenced previous patent applications by the inventor.

In certain platforms, it is known to provide playbooks that, once created, can be improved in a democratic fashion by team members over the course of time.

SUMMARY

It is an object of the invention to enhance selection of an appropriate playbook for a new incident.

According to the apparatus and method of responding to cybersecurity incidents of one aspect of the invention, a new cybersecurity incident is registered at a security incident response platform. At a playbook generation system, details are received of the new cybersecurity incident from the security incident response platform. At least some of the details correspond to a set of features of the new cybersecurity incident. A set or subset of nearest neighbors of the new cybersecurity incident is localized in a feature space. The nearest neighbors of the new cybersecurity incident are other cybersecurity incidents having a distance from the new cybersecurity incident within the feature space that is defined by differences in features of the nearest neighbors with respect to the set of features of the new cybersecurity incident. A custom playbook is created for responding to the new cybersecurity incident. The custom playbook has one or more prescriptive procedures, for responding to the new cybersecurity incident registered by the security incident response platform, that are based on occurrences of prescriptive procedures previously employed in response to the nearest neighbor cybersecurity incidents, and on distances of the nearest neighbors of the new cybersecurity incident in the feature space. A user of the security incident response platform is presented with the custom playbook containing the one or more prescriptive procedures for responding to the new cybersecurity incident. The user of the security incident response platform initiates the one or more prescriptive procedures contained in the custom playbook to respond to the new cybersecurity incident.

This aspect of the invention makes it possible to employ a custom machine learning system to propose a playbook tailor-made for the new incident based on all data available at any time about the incident and similar incidents (including all relevant fields of the new incident and all past pairings of similar incidents with playbooks), or based on at least some of the available data. The custom machine learning system is able to learn a model based on historical data. This model can integrate past decisions (i.e., past selections of playbooks playbook customizations) of the users and for each new incident, it can provide a number of playbooks based on the model.

According to the apparatus and method of another aspect of the invention, the user of the security incident response platform responds to the cybersecurity incident by initiating a set of one or more prescriptive procedures that differs from the set of the one or more prescriptive procedures contained in the playbook. At the playbook generation system, the new cybersecurity incident is recorded in the feature space, and the new cybersecurity incident is automatically tied to the one or more prescriptive procedures actually initiated by the user in responding to the new cybersecurity incident, thereby automatically altering subsequent recommendations of playbooks for responding to cybersecurity incidents having features similar or identical to the set of features of the new cybersecurity incident.

This aspect of the invention makes it possible to integrate user customization, as well as user removal or addition of actions after playbook selection, as an automatic feedback into the system such that the system knows which actions of the playbook were correctly proposed and which were not.

The details of various embodiments of the invention are set forth in the accompanying drawings and the description

DESCRIPTION OF THE DRAWINGS

FIG. 2 is a table of fields of a log record of an incident, along with their associated feature types and the encoding employed for each feature type in order to transform the incident into a set of features in a feature space.

FIG. 9 is a screen display through which a user can notify a cybersecurity incident response system of the creation of an incident.

FIG. 10 is a screen display through which a custom playbook is presented to a user.

DETAILED DESCRIPTION

The present invention provides a system designed to stand independently on a platform of a cybersecurity incident response system, such as, for example, the IncMan incident response platform available from DFLabs.

The principal capabilities of the custom machine learning system provided by the invention can include the following:

1) Ability to provide a playbook (i.e., a set of actions) based on all relevant fields of the new incident and based on all past pairings of incident with playbook(s);
2) Ability to integrate user feedback, i.e., removal or addition of actions after playbook selection;
3) Ability to respond in real time, i.e., provide playbook for a new incident almost instantly;
4) Ability to work with sparse or limited amount of data; and
5) Ability to consider Common Event Format (CEF) fields for playbook recommendation. CEF are used to describe artifacts inside every incident.

The machine learning concept is based on the principle of looking of past incidents that are similar to a new incident. Once such similar incidents are found, their playbooks are collected as relevant ones and reasoned over. The playbooks can be also represented as sets of actions. Then the frequency with which specific actions are included in all playbooks is considered. Based on the frequency of action presence and distance of relevant playbooks, a weight between 0 and 1 is assigned to all actions present in the platform of a cybersecurity incident response system.

Subsequently, user feedback is integrated: actions that were previously rejected by the user are less likely to be proposed and actions that were previously manually added (so-called custom actions) are considered for addition.

Finally, given a threshold (i.e., a number between 0 and 1), a playbook is proposed with all actions with weight above the threshold. By giving (or predefining) multiple thresholds, the system can propose multiple playbooks simultaneously.

Figure 1:
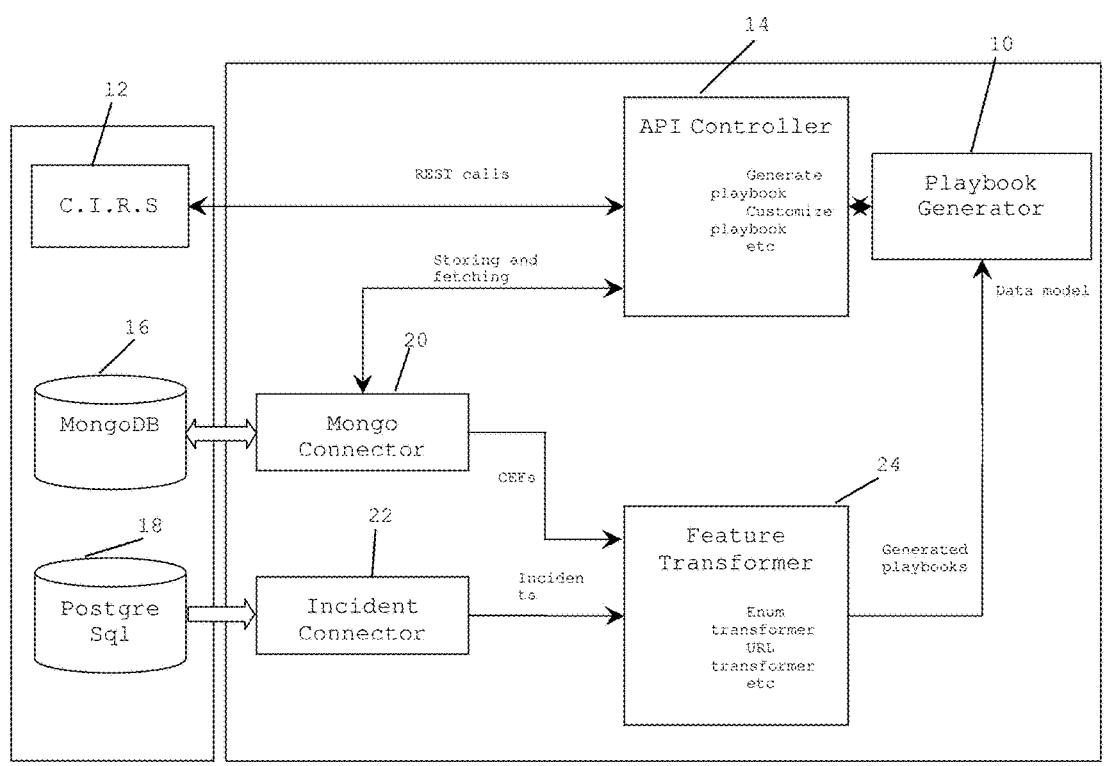
FIG. 1 is a block diagram of the architecture of a playbook generation system according to the invention interfacing with a cybersecurity incident response system.

With reference to FIG. 1, one embodiment of a playbook generation system 10 according to the invention is accessed by a cybersecurity incident response system 12 through a predefined application program interface (API) under the control of API controller 14, and responds to a number of requests generated by cybersecurity incident response system 12. For example, cybersecurity incident response system 12 makes REST calls to API controller 14 to notify playbook generation system 10 of incidents created, updated, or closed, customizations of source incidents, use of generated playbooks, and additions or removals of actions from playbooks; and, API controller 14 makes REST calls to cybersecurity incident response system 12 to notify it of proposed playbook actions. The playbook generation system 10 is able to autonomously construct and update the model independently of the platform of cybersecurity incident response system 10.

The playbook generation system 10 accesses the data in databases 16 and 18 through its connectors 20 and 22 and gets all relevant data for building the model from the databases (both MongoDB database 16 and PostgreSQL database 18—the two databases utilized by the cybersecurity incident response system 12). Mongo connector 20 defines how data is either read from or stored to MongoDB database 16. Incident connector 22 defines how data is either read from or stored to PostgreSQL database 18. An incident is represented as a row in an incidents table in the PostgreSQL database. To be able to convert the columns of the table to features in feature transformer 24 we first need to know the types of the columns. These types are fetched from an ims_fields table. Also, some of the columns of the table are encrypted. This information is obtained from an information schema table. Information from all these three tables combined allows us to load the stored data to playbook generation system 10 and further parse the data.

Feature transformer 24 encapsulates all of a set of feature generators, details of which are described below. Feature transformer 24 provides an application program interface that, given the parsed data from the incidents table described above, produces a Boolean matrix of extracted features. Features correspond to incident fields. Each field can be configured with a weight. In this manner, the user can customize each field and the importance the fields have for the machine learning technique. Each feature generator is a transformation that for a given value from an incident and its type produces one or more features. The following feature generators are implemented: Boolean feature generator, present feature generator, enum feature generator, and enum set feature generator. The operation of these feature generators is described below in connection with FIG. 2.

The playbook generation system 10 saves its model and performance measurements into several MongoDB Collections. The playbook generation system itself is exposed through a web server providing REST implementation of the API.

The playbook generation system follows the standard machine learning approach: model construction, model query and model update. In the first stage a model is constructed based on the historical data. In a query stage the model is queried for an output (i.e., a recommended playbook). In the update stage, the model is updated with new information.

The machine learning technique is based on the concept of fuzzy nearest neighbor search and subsequent data fusion. An example of fuzzy nearest neighbor search is described in Keller. James M., Michael R. Gray, and James A. Givens, "A fuzzy k-nearest neighbor algorithm," IEEE transactions on systems, man, and cybernetics 4 (1985): 580-585 (ieeexplore.ieee.org/document/6313426), which is hereby incorporated herein by reference.

Model Construction

The main steps of the model construction stage are as follows:
1) Extraction of relevant attributes and translation into features; and
2) Transformation of historical (closed) incidents into the feature space; and
3) Storage of the populated feature space; and
4) Storage of custom actions played for each incident.

The transformation of features of an incident into a feature space (by feature transformer 24 in FIG. 1) involves creation of a feature vector, which is an n-dimensional vector of numerical features that represent the incident. The feature space is the vector space associated with the feature vectors.

Model Query

The model is queried by requesting playbook for a new incident. The main steps are the following:
1) Transformation of the new incident into the features;
2) Localization of K nearest neighbors (special cases for highly irregular feature spaces are described below);
3) Fusion of: frequencies of action played, distance of neighbors from the incident, age of closed incidents, and user feedback; and
4) Thresholding of the action set to get the playbook.

Model Update

The model is updated once a particular new incident is closed. This means that the following steps (similar to the model construction stage) are performed:
1) Transformation of the closed incident into the feature space;
2) Update of the stored feature space; and
3) Update of the custom action storage.

Feature Extraction and Feature Space Representation

With reference to FIG. 2, the features for an incident are generated from fields, each of which has a certain type. Depending on the type, a specific transformation is called.

The schema of the incidents table allows values in the columns to be null. Feature "present" is true if the value is not null, which is particularly useful for rich fields, such as texts or URLs. It would not be possible to create a feature for all possible URLs, because there are too many of them. But it might be interesting to know whether an investigator had to deal with any URL, because consequently the investigator might take some action based on this fact. On the other hand, "checkbox" is a very simple type, which is either checked or unchecked. A checkbox cannot have a missing value. Thus the "Boolean" feature directly reflects the Boolean state of the checkbox.

The table of FIG. 2 illustrates the transformation of different types of fields into features:

Basically, all different types are separated into four groups:
1) Untranslatable into the feature space (Feature=None). For example, the "text" type is too rich to translate, and it is difficult to extract meaningful representative features out of it. Other features might just not be robust, as, for example, date and time. Since it is not possible to know the context, it is not possible to guess that a particular hour of a day of an incident is going to be representative when comparing incidents.
2) Boolean encoding—i.e., types that are either Boolean by nature or have information that is tested for presence—i.e., present or missing. The test on presence is reduced to Boolean representation as well. For example, the types IP, HASH, EMAIL, URL, and FILENAME are too rich for one-hot or many-hot encoding, and yet it might be useful to know that an investigator had to deal with fields of these particular types.
3) One-hot encoding—a special type of encoding for types that contain a finite set of possible values. For example, for type "timezone," it might be interesting to know that the problem being solved occurred in a specific part of the world. Given a field that can have only one of three values: {A, B, C}, we can encode the values into binary vectors 001, 010, and 100 (i.e., only one bit from the binary encoding is 1, thus one-hot encoding). These binary vectors are then added into the feature space. Thus, for types with, e.g., three values, the feature space will be extended by 3 dimensions.
4) Many-hot encoding—a generalization of one-hot encoding is many-hot encoding, which allows multiple positions of a vector to be true. Many-hot encoding is a generalization of a one-hot encoding to represent subsets of elements.

For Boolean encoding, a Boolean feature generator of feature transformer 24 of FIG. 1 extracts a Boolean value from a given input as implemented by the python's bool._call_function. For example:

"True"→True
"False"→False
" "→False
0→False
1→True
. . .

A present feature generator of the feature transformer produces feature "True" if the underlying value is present (is not null or is not an empty string, and produces feature "False" otherwise.

An enum feature generator of the feature transformer encapsulates one-hot encoding. To encode a variable having one of N possible values, a Boolean vector of length N is produced. Each position of the vector represents exactly one value from the original set of N values. Only one value of the vector is allowed to be "True." Also, the value being "True" signifies that the element represented by the particular position of the vector is the one assigned to the variable. A generalization of one-hot encoding is many-hot encoding, which allows multiple positions of a vector to be true. Thus, the vector can be represented as a subset of the original N elements. An enum set feature generator of the feature transformer encapsulates many-hot encoding.

Figure 3:
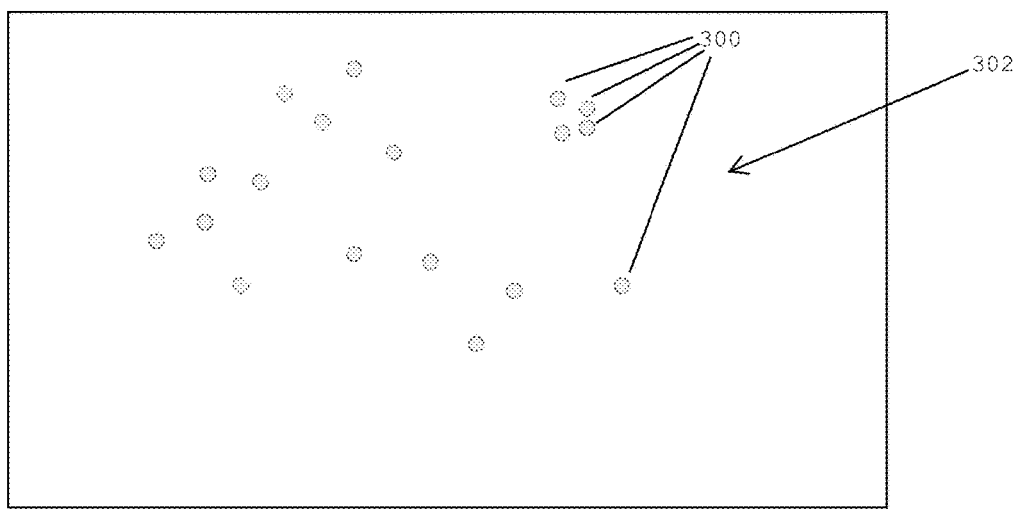
FIG. 3 is a two-dimensional representation of a set of incidents in a many-dimensional feature space.

With reference to FIG. 3, there is shown a representation of incidents 300 in a two-dimensional representation of what is actually a many-dimensioned feature space 302. A two-dimensional projection of a multi-dimensional space is chosen only for ease of illustration. In particular, a number of historical incidents 300 are defined by their attributes. These incidents are represented as samples in a so-called feature space 302. The features are constructed from the attributes of the incident. The representation of FIG. 3 will evolve in the next sections to explain steps of the nearest neighbor search.

Nearest Neighbor Search

Figure 4:
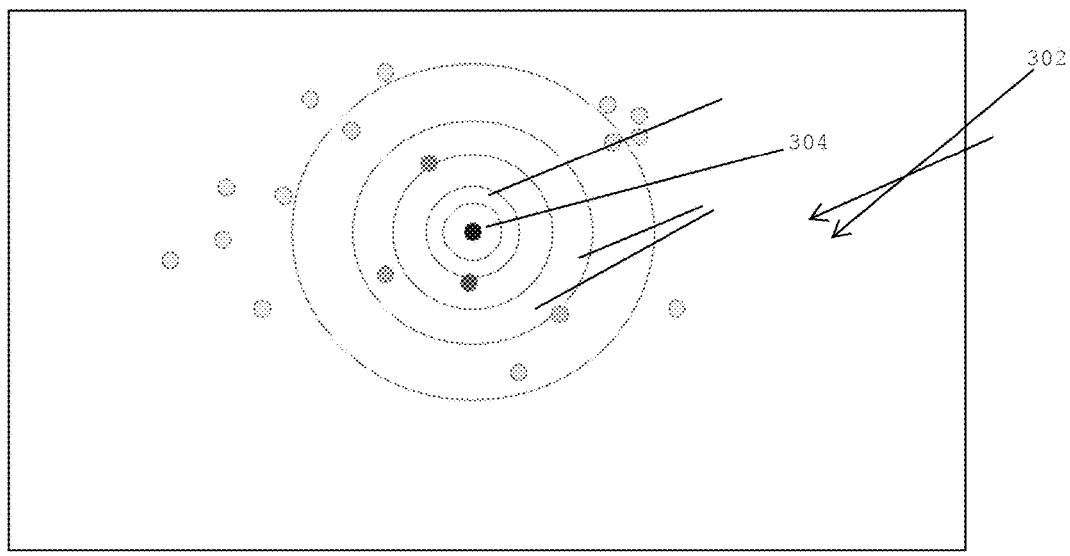
FIG. 4 is the two-dimensional representation of FIG. 3, with concentric circles illustrating distances within the feature space with respect to a particular new incident.

With reference to FIG. 4, the feature space 302 is a space over which a distance metric can be defined. With the metric, one can measure the distance between any two points on the feature space. Given two incidents with different attributes, they can be transformed into the feature space (through the encoding explained above) and subsequently, a metric can be called. This metric measures the distance in the feature space, and thus we can compare distance between any two incidents. Using this approach, we can find K nearest neighbors (with asymptotically linear complexity). In FIG. 4, the nearest neighbors of incident 304 are those other incidents whose distance in the feature space as measured by the metric is shortest with respect to incident 304. The concentric circles in FIG. 4 represent different distances from incident 304 as measured by the metric.

Data Fusion

Figure 5:
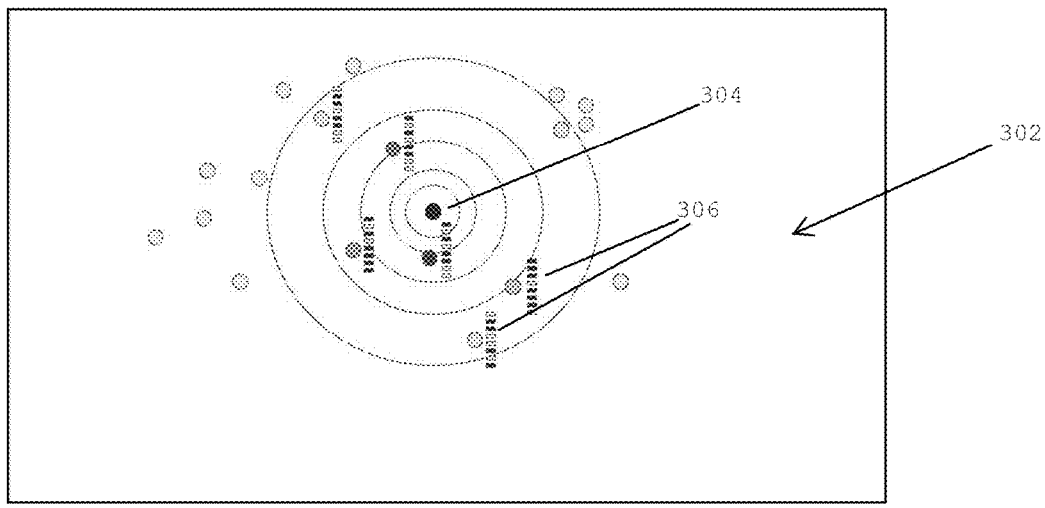
FIG. 5 is the two-dimensional representation of FIG. 4, together with representations of playbooks for K nearest neighbors of the particular new incident.

With reference to FIG. 5, given K nearest neighbors of incident 304 (the neighbors within the outermost circle in FIG. 5), it is possible can get all playbooks 306 played for each incident. The existing incidents in the feature space 302 have been resolved previously and thus have one or more playbooks 306 with actions assigned. The rectangles of playbooks 306 correspond to actions. In reality, the set of rectangles correspond to all actions every played. Those actions that were committed are colored dark. In other words, for each incident, the committed actions from the complete action set are listed. The playbooks in general differ in some actions, and some actions are identical for various playbooks. In FIG. 5, playbooks are represented by rectangles correspond to Boolean representations of eight different actions that may or may not have been called for in different playbooks. As the incidents are closed, we expect that the committed and completed actions are those that should be recommended. For each incident, we collect all committed actions. These committed actions are considered to be ideal playbooks for each incident.

The formulas set forth below, which culminate in a score calculation for a particular action, are iterated over all actions in the action set, and for each action, there is a Boolean value of 0 or 1 depending on whether the action was committed are not in connection with a particular incident. The actions themselves are not Boolean, however, because they are prescriptions for the operator of what to do.

Having the set of actions to be recommended for each past incident, we consider each action separately. For each action, we compute a score from the interval [0,1] that translates into the certainty of recommending this action. The following partial computations are used for the computation of the score:

$$\text{relevance}_\alpha(i_{new}, i_{ref}) = 1/(\alpha \cdot \text{dist}(i_{new}, i_{ref}) + (1+\alpha) \cdot \text{age}(i_{ref}) + 1)$$

I.e., first, the relevance of an incident with respect to another one is defined by the equations above. The relevance is given by the distance between the incidents in the feature space and by the age of the reference incident (given that the new incident has age 0). To find K neighbors, the relevance of each incident is measured as defined by the above equation. Using the relevance equation, it is possible to find K nearest incidents according to a weighted metric, which is influenced by the user's setting of the parameter $\alpha$, discussed below.

The distance between two incidents is computed as the average of weighted feature values:

$$\text{dist}_w(i_1, i_2) = \frac{1}{|\text{features}|} \sum_{f \in \text{features}} w_f \cdot \|i_1[f] - i_2[f]\|_1$$

The weights are set by the users in the user interface and are set to "ignore," "low," "medium," and "high" corresponding to values 0, 0.25, 0.5, 1 respectively. I.e., ignored fields are not considered, low weight fields are half as important as the default medium fields, and high weight fields are twice as important as default medium fields and four times as important as low weight fields.

The age($i_{ref}$) function is defined as:

$$\text{age}(i_{ref}) = \min(1; \text{days}(i_{ref})/\tau)$$

Figure 6:
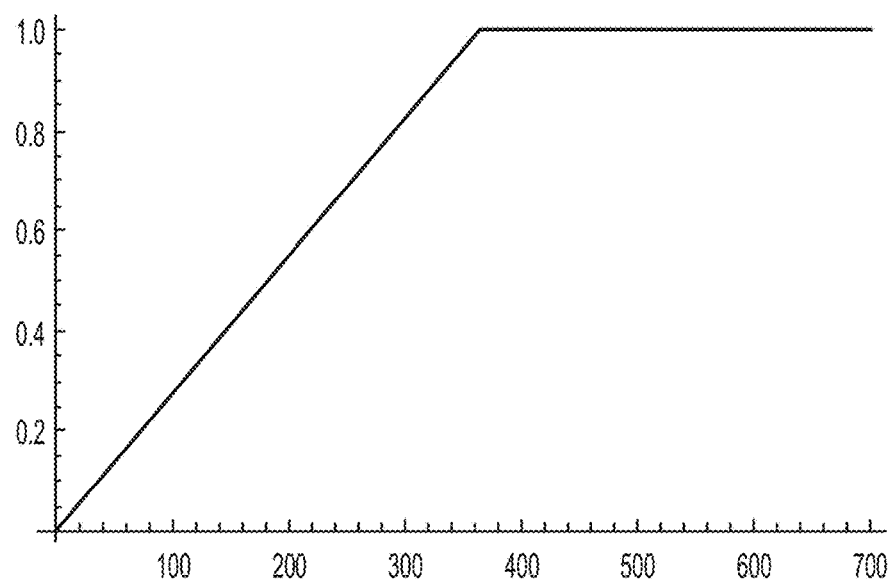
FIG. 6 is a plot of an age function used in accordance with the invention as part of the process of determining relevance of a prior incident with respect to a new incident.

I.e., it is a normalized thresholded age, where days($i_{ref}$) is the incident age in days and T is a threshold with a default value set to 365. The plot of FIG. 6 shows the behavior of the age($i_{ref}$) function for the default values.

The $\alpha$ parameter is from the range [0,1] and it specifies the weight that is given to similarity and weight that is given to age (either the similarity of incidents is more important and the age is less important or vice versa). By default, the recommended value is 0.5.

Finally, the score of an action is computed as an average relevance weighted by the commitment frequency of the action:

$$\text{score}(a_j, i_{new}) = \frac{1}{|n|} \sum_{i_{ref} \in \text{relevant}} \text{committed}(i_{ref}, a_j) \cdot \text{relevance}_\alpha(i_{new}, i_{ref})$$

$$\forall a_j \in A$$

The score is computed over all relevant incidents (denoted as "relevant" in the sum subscript) by the multiplication of action presence (denoted by function "committed($i_{ref}$, a,)" which returns 1 if the action $a_j$ was committed in the incident $i_{ref}$, 0 otherwise) with incident relevance. There are K nearest incidents (determined according to the relevance distance discussed above) that are members of the "relevant" set. The action set "A" is the complete set of actions in the security incident response platform. The set "A" can be optimized (its size minimized) by defining A as a union of committed actions over all relevant incidents. Computationally, however, the mathematical operations over the action set are very fast, and the asymptotical complexity is linear, and so the size of the action set should not matter.

The fuzziness of the approach described above lies in the computation of an action score; i.e., the relevance is used to weigh the score of the action. In other words, the fuzzy set membership is defined by the relevance and it is used to "merge" information from the K nearest neighbors together. In contrast, a classical non-fuzzy K nearest neighbor technique might omit the relevance in a score computation and the score would be given only as the number of times the action was committed divided by K.

Playbook Generation Process

Once all actions have a score assigned, we can choose a threshold. All actions with a score above the threshold will be recommended to be played. For multiple thresholds, multiple playbooks can be generated automatically as well.

Handling Special Cases

The spatial distribution of incidents within the feature space can vary widely from client to client. The following sections describe special cases and describes, how the system handles these cases.

Few Data Available/Sparse Data

If only a minimal amount of data is available (i.e., the platform is installed freshly at the customer's premises), it is possible that the technique described above cannot find K nearest incidents, as they are simply not yet present in the system. In such cases, a fallback mechanism kicks in: for cases where an incident identical in the feature space is found, its playbook is used for the recommendation of actions. If multiple identical incidents are found, their playbooks are fused by the mechanism described above.

Large Clusters of Identical Incidents

In cases in which a tool is generating incidents automatically, it is possible that hundreds or thousands of identical incidents (identical in the position in the feature space, not necessarily in all data) are generated in the lifetime of the platform. In such cases, these identical incidents form a cluster in the space that overweighs all other incidents in the vicinity. If we pick K nearest incidents for a new incident that is near this cluster, all K incidents fall into the cluster, and thus there is no required variety of playbooks. In such cases, we take from the cluster only a subset, which have unique playbooks (i.e., playbooks with different sets of actions). The remaining incidents from the cluster (with playbooks also identical to the others in the cluster) are ignored and other, more distant neighbors are searched for. In other words, if there are more than (or equal to) K incidents in the cluster, no additional incidents are searched for. If there are fewer than K incidents in the cluster, additional incidents are searched for.

Figure 7:
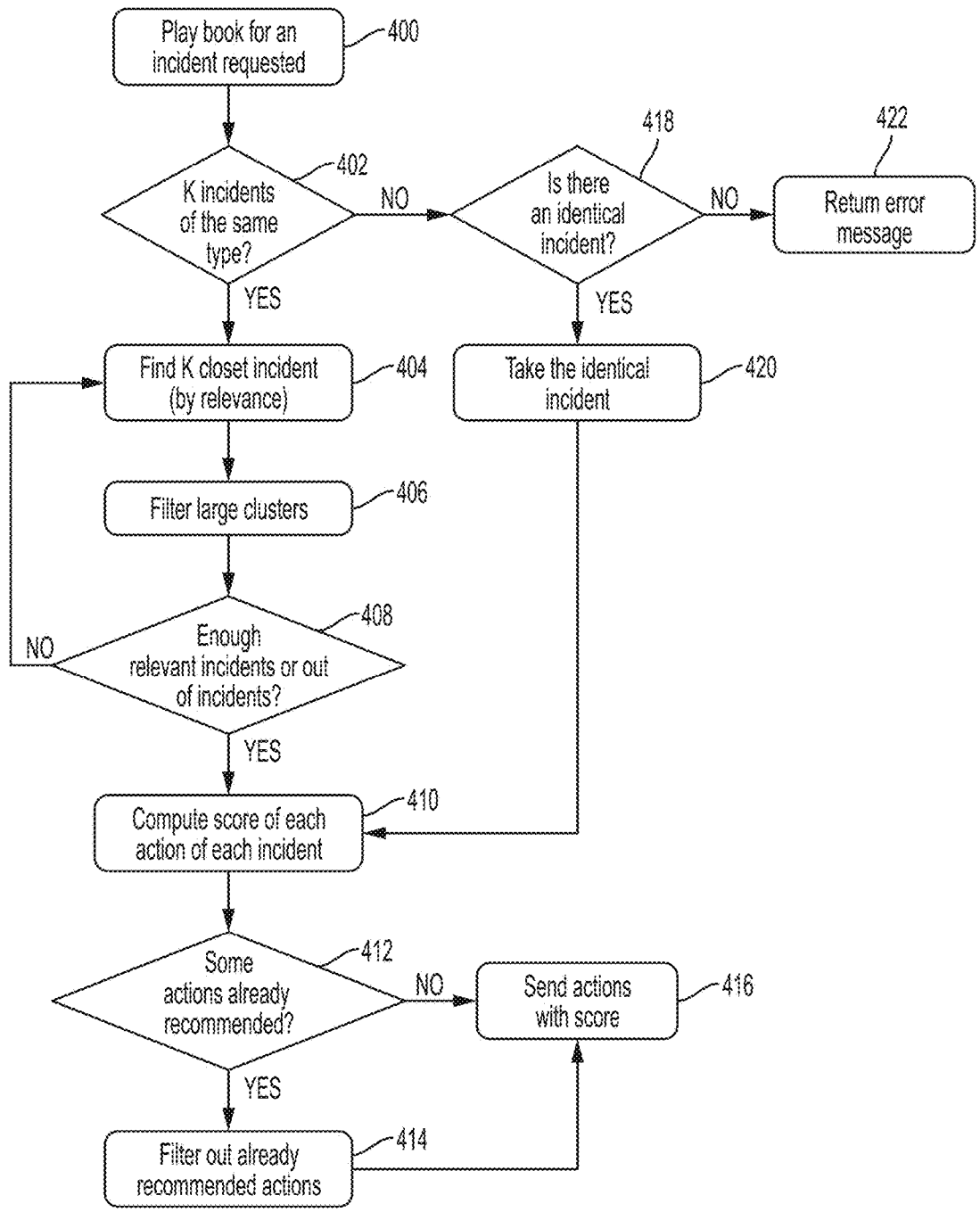
FIG. 7 is a flowchart detailing the steps corresponding to identifying K nearest neighbors and then applying the different machine learning steps to the K nearest neighbors.

FIG. 7 is a flowchart detailing the steps corresponding to identifying K nearest neighbors and then applying the different steps described above to the K nearest neighbors. In step 400, a playbook for an incident is requested. If there are K incidents of the same type (step 402), the K closest incidents are found, by relevance (step 404), and any large clusters are filtered (step 406) according to the technique described above, until enough relevant incidents are found or there are no more incidents (step 408). The score of each action of each incident is calculated using the techniques described above (step 410). If some actions have already been recommended (step 412) the already-recommended actions are filtered out (step 414); otherwise the actions with their scores are sent for comparison with a threshold (step 416).

If there were not K incidents of the same type (step 402), but there is an identical incident (step 418), the identical incident is used (step 420) for computation of the score of each action in the incident (step 410); otherwise an error message is returned (step 422).

User Feedback Integration

The user feedback to playbook recommendation is integrated in the following way:

1) If the user does not pick the recommended playbook at all and picks a different playbook, the feature space with the incidents is enriched by this selection. In other words, the selected playbook will be tied to the incident and the recommended playbook will not be used. In subsequent cases in which the technique is employed, the selection of the different playbook will be seen in the database and the actions of the different playbook will be considered according to the technique described above in connection with similar incidents, thus adapting to the selection of the different playbook.

2) If the user picks a recommended playbook and removes some actions, the playbook is tied to the incident, which is, once closed, recorded in the feature space. In subsequent recommendations, the removed actions have a lower probability of being recommended. In other words, the feedback concerning a user removing an action is inherently reflected in playbooks generated in the future. In the technique described above, it can be seen that the relevance of an action depends on the relative number of incidents in which the action was assigned to someone. Thus, since the action was removed from an incident's playbook, when in the future actions of this particular incident are used to synthesize a new playbook the score of the action is affected by the fact that it was removed in the first place.

3) If the user picks a recommended playbook and adds some actions, these actions are custom: They are thus treated with a special flag and for the subsequent recommendations, these actions are shown irrespectively of their score (and by default selected to be played). The user will have all manually added actions present in the recommended playbook. More precisely: When a custom action is manually added by a user, the security incident response platform notifies the playbook generation system. Because custom actions are uniquely identified, they have one undesired property: they can never occur in more than one playbook, and thus even though they are included in the final list of recommended actions for an incident they could seem almost irrelevant because they always occur only once. To solve this problem, a list of manually added actions are tracked and labelled as custom (treated with the above-described special flag), thereby making it possible as a practical matter to present the custom actions in the final recommendation in the user interface in a special fashion. However, the user can also remove the recommended actions from the playbook if he wishes so, and the deleted custom actions do not need to be addressed in a special way because ordinary usage of the above-described machine learning technique augments the data such that the removed or unused actions tend to stop appearing.

Performance

The performance of the technique described above has to be high enough to allow real-time playbook assembly. The complexity of the technique is linear in the number of incidents and linear in the number of actions. The transformation of the incident into the feature space is straightforward—the asymptotic complexity is of $O(t*n)$ where t is the number of fields of the incidents and n is the number of unique values in case of cardinal types (such as enums).

The custom machine learning technique is computationally fast (i.e., linear in the number of incidents and the number of actions), and thus there should be no need to increase the performance. If needed, however, performance can be increased by reducing the number of potentially relevant incidents and the number of relevant actions. If, for some reason, it becomes desirable to reduce the size of the sets, the solution would be simple: 1) to optimize (minimize the size of) action set A, it can be defined as a union of committed actions over all relevant incidents; and 2) to optimize (minimize the size of) the set of potentially relevant incidents (not to iterate over all of them, however, only over a subset), the incidents can be arranged in a quadtree to have a spatial sorting mechanism in place and iterate by distance.

Communication API

Figure 8:
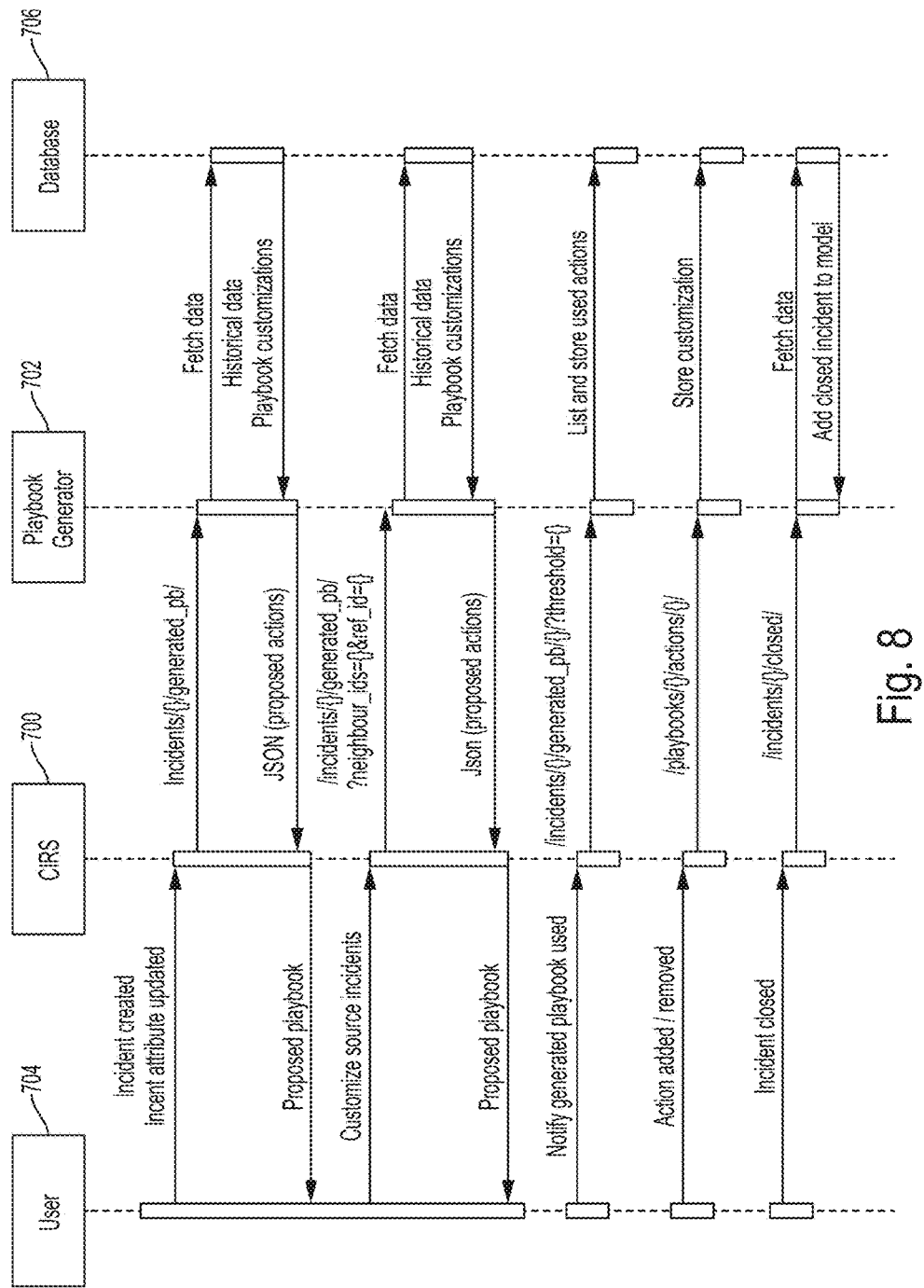
FIG. 8 is a diagram illustrating the exchange of information between a user, a cybersecurity incident response platform, a playbook generation system according to the invention, and a database.

With reference to FIG. 8, the communication API allows the cybersecurity incident response system 700 to communicate with the playbook generation system 702 in a straightforward way. The user 704 has no means to communicate directly with playbook generation system 702. Rather, the user interacts with the system through a web interface, which is connected to the cybersecurity incident response platform. The platform subsequently calls the playbook generation system, which runs as an independent microservice on the very same virtual machine. The playbook generation system returns results to the cybersecurity incident response platform, which returns results to the user.

Some commands from user 704 trigger actions in cybersecurity incident response system 700 that call playbook generation system 702, which in turn fetches data from database 706 and stores used playbook actions and playbook customizations in database 706. The diagram of FIG. 8 captures all relevant exchange of information. Playbook generation system 702 is a daemon that exposes a webservice that cybersecurity incident response system 700 uses, in order to propose actions compatible with a newly created incident. The webservice exposes some REST methods to cybersecurity incident response system 700 but does not expose anything to user 704.

There are two distinct activities by which the user can modify the attributes of an incident (thus the features of the incident): (1) by creating a new incident, or (2) by updating one or more of the attributes (for example, some attributes might be missing at the beginning and during the incident response, new facts are discovered and added as attributes to the incident). The second activity arises in situations in which the user learns a new fact about the incident and updates the incident. For example, imagine that the user finds out from which IP the incident arose, and adds the IP into one of the CEF fields, which are transformed by the playbook generation system into features. In this case, the playbook generation system has to update feature values of the incident, after which the playbook generation system can potentially present a new set of actions to be played.

The playbook generation system communicates proposed playbook actions to the cybersecurity incident response platform using JSON (JavaScript Object Notation), which is de facto a standard data format for information exchange via the REST application program interface.

During the playbook recommendation phase, the user is presented with a list of recommended actions together with the relevant incidents (determined using the K nearest neighbor technique describe above) from which the actions were taken. The user can then remove or add some of the incidents (if, for example, the user does not consider them relevant or knows about an incident that might be important). The playbook generation system reflects the user's actions by recomputing the proposed playbook based on the updated set of incidents, according to a process described above.

The REST application program interface is defined as follows:

Info
    GET /
        Returns simple "hello world" message.

Init
    POST /init/
        Initializes playbook generation system, call this endpoint after startup Playbook
    POST /generatedpb/
        Generates playbook from given features
    GET /incidents/{incident_id}/generatedpb/
        Generates playbook using features from referred incident
    POST /incidents/{incident_id}/generatedpb/{generatedplaybook_id}/
        Acknowledges using the generated playbook
    PUT /incidents/{incidentid}/closed/
        Triggers recomputing model after closing an Incident Actions
    DELETE /playbooks/{playbooks_incidents_id}/actions/{action_id}/
        Notify about action removed from a playbook
    POST /playbooks/{playbooks_incidents_id}/actions/{action_id}/
        Notify about action added to a playbook Blacklist
    GET /blacklist/
        Returns list of blacklisted actions
    DELETE /blacklist/{action_id}/
        Removes given action from blacklist
    POST /blacklist/{action_id}/
        Adds given action to blacklist Projected Data
    GET /incidents/ {incidentid}/actions/
        Returns actions from playbooks on an incident used by playbook generation system
    GET /incidents/ {incidentid}/features/
        Returns features of an incident used by playbook generation system Settings
    GET /settings/nearest_neighbour_count/
        Returns number of nearest neighbours used to generate a new playbook
    POST /settings/playbook_neighbours/
        Sets number of nearest neighbours used to generate a new playbook
    GET /settings/relevant_incident_age/
        Returns the age in months after which a playbook is considered to be less relevant
    POST /settings/relevant_incident_age/
        Sets the age in months after which a playbook is considered to be less relevant
    GET /settings/weights/
        Returns weights of individual features used by playbook generation system
    POST /settings/weights/
        Sets weights of individual features used by playbook generation system Stats
    GET /stats/
        Returns statistics of the playbook generation system machine learning Availability
    GET /types/
        Dictionary which shows the how many incidents of each individual type the playbook generation system currently takes into account
    GET /types/{incident_type}/available/
        Returns True if we have enough incidents of given type, False otherwise.

Figure 9:
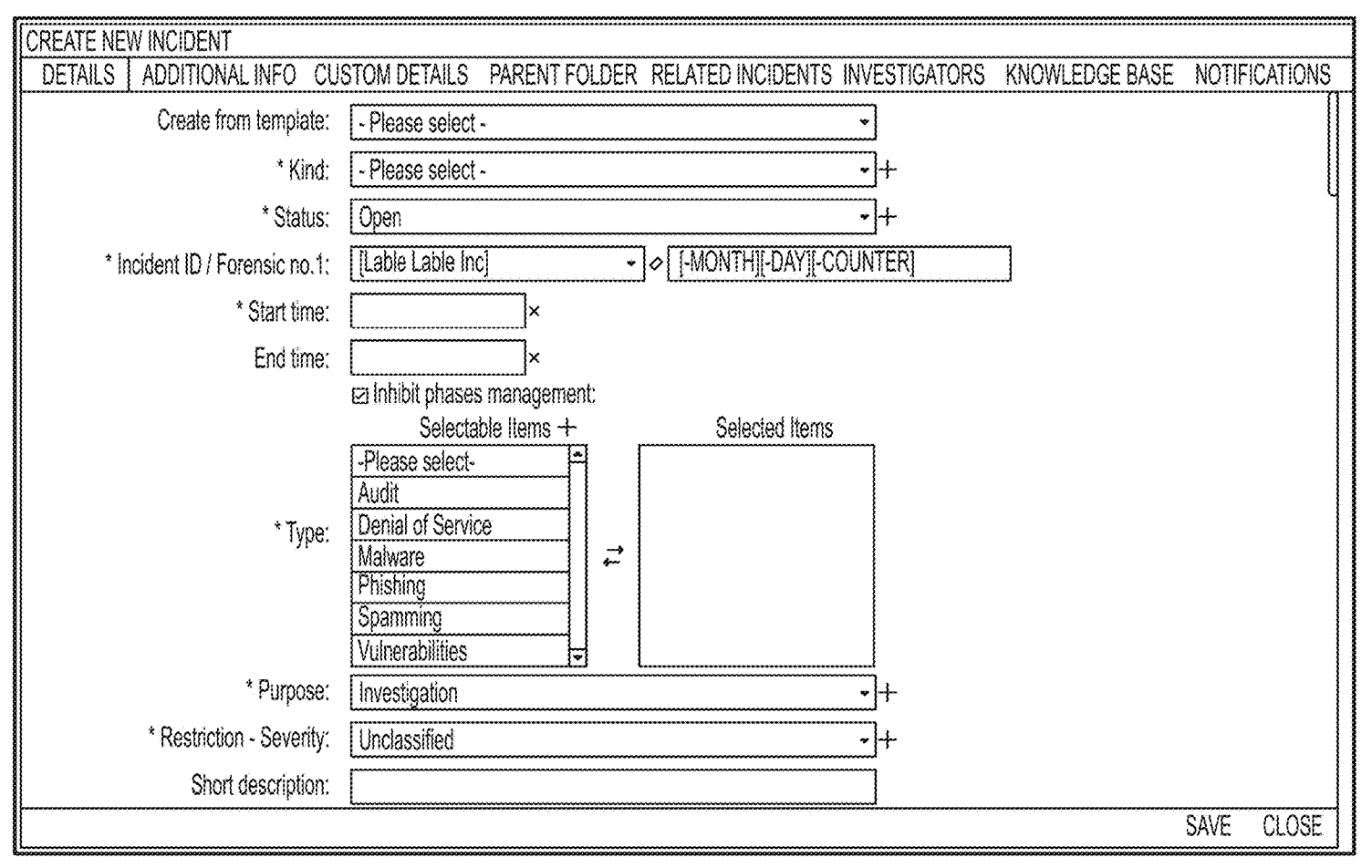
Figure 10:
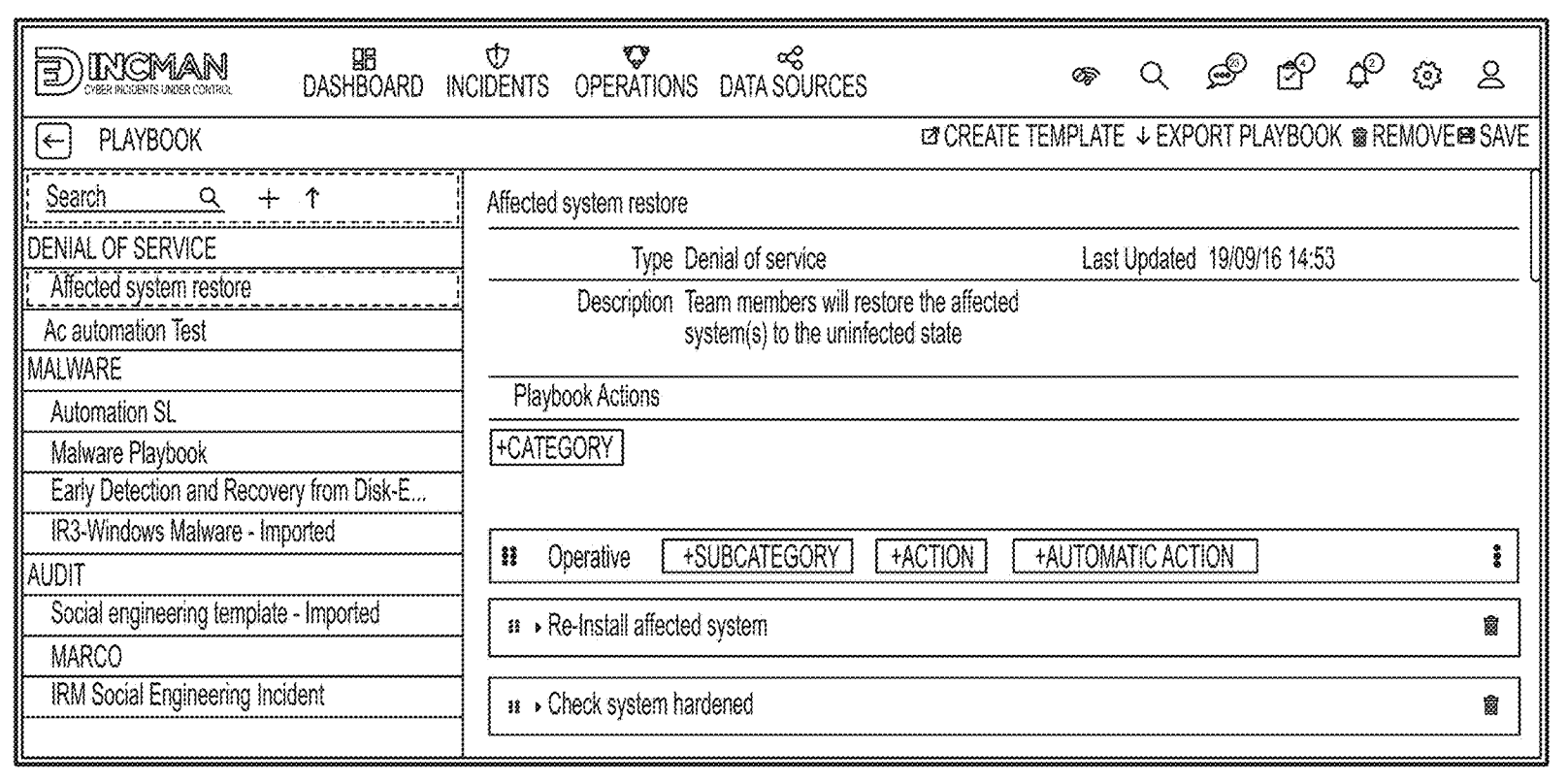
Figure 11:
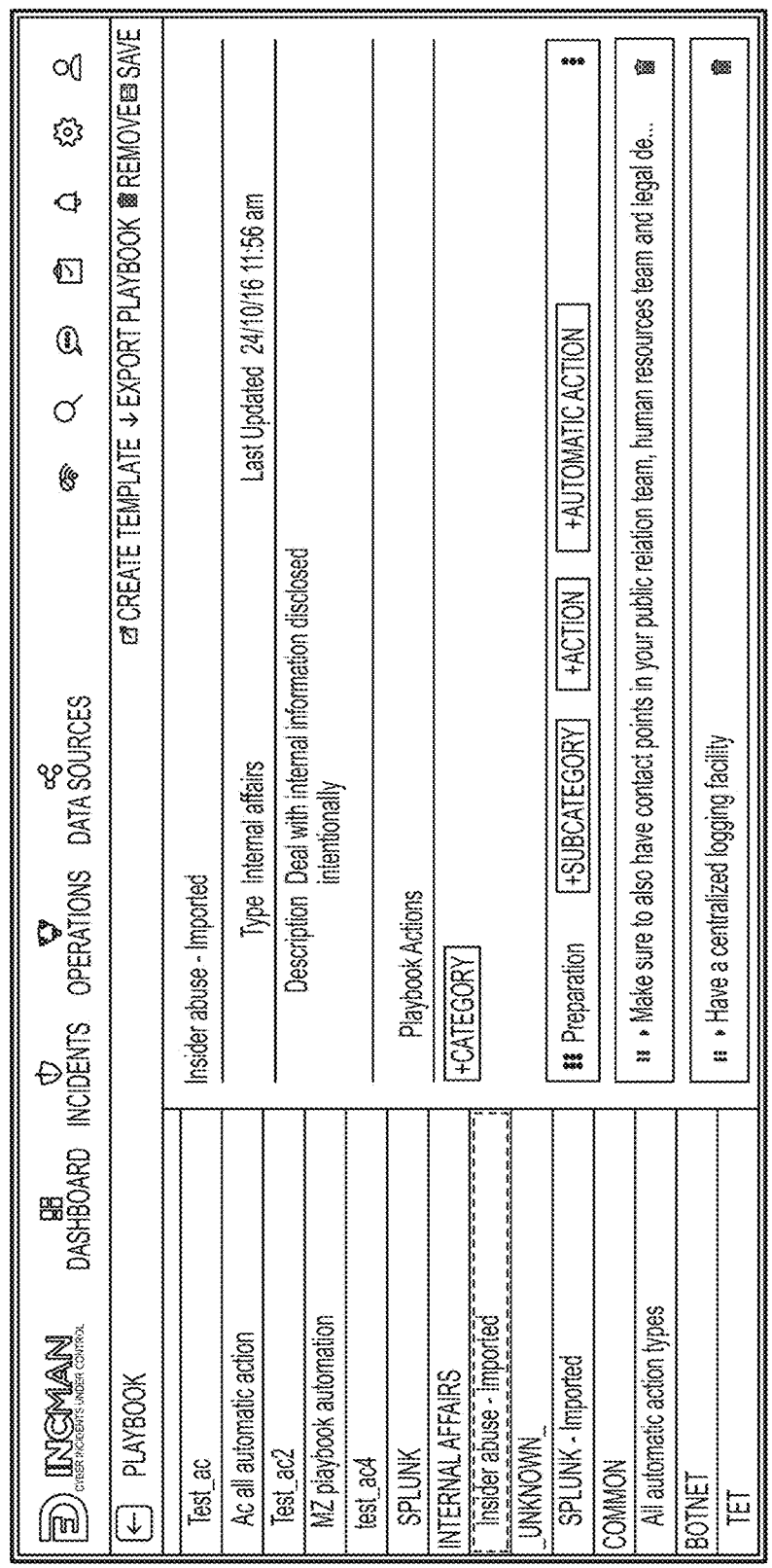
FIG. 11 is a screen display through which a different custom playbook is presented to a user.

With reference to FIGS. 9-11, there are shown examples of displays through which the user interfaces with the playbook generation system through the cybersecurity incident response system. FIG. 9 shows a screen display through which the user can notify the cybersecurity incident response system of the creation of an incident. FIGS. 10 and 11 show screen displays through which details of a proposed playbook are displayed to a user. In the specific example of FIG. 19, the playbook generation system according to the invention has recommended a custom playbook for a denial of service incident that includes prescriptive procedures for restoring the affected system to its uninfected state. In the specific example of FIG. 11, the playbook generation system according to the invention has recommended a custom playbook for an insider abuse incident that includes prescriptive procedures for dealing with internal information disclosed intentionally. In each instance, the custom playbook is produced by the playbook generation system according to the techniques described herein, and the user may choose to use the custom playbook, or use a different playbook, or remove an action to the custom playbook, or add an action to the custom playbook, and the playbook generation system records the user actions according to the techniques described herein, so to affect future custom playbook recommendations.

There has been described a cybersecurity incident response and security operation system and method employing playbook generation through custom machine learning. While several particular forms of the invention have been illustrated and described, it will be apparent that various modifications and combinations of the invention detailed in the text and drawings can be made without departing form the spirit and scope of the invention. Accordingly, it is not intended that the invention be limited, except as by the appended claims.

What is claimed is:

1. A method of responding to cybersecurity incidents, comprising:
    at a security incident response platform, registering a new cybersecurity incident;
    at a playbook gene ration system:
        receiving details of the new cybersecurity incident from the security incident response platform, at least some of the details corresponding to a set of features of the new cybersecurity incident;
        localizing a set or subset of nearest neighbors of the new cybersecurity incident in a feature space, the nearest neighbors of the new cybersecurity incident being other cybersecurity incidents having a distance from the new cybersecurity incident within the feature space that is defined by differences in features of the nearest neighbors with respect to the set of features of the new cybersecurity incident; and
        creating a custom playbook for responding to the new cybersecurity incident, the custom playbook having one or more prescriptive procedures, for responding to the new cybersecurity incident registered by the security incident response platform, that are based on occurrences of prescriptive procedures previously employed in response to the nearest neighbor cybersecurity incidents, and on distances of the nearest neighbors of the new cybersecurity incident in the feature space;
    presenting to a user of the security incident response platform the custom playbook containing the one or more prescriptive procedures for responding to the new cybersecurity incident;
    the user of the security incident response platform initiating the one or more prescriptive procedures contained in the custom playbook to respond to the new cybersecurity incident;
    wherein the details of the new cybersecurity incident are contained in fields of a log record, and the playbook generation system transforms the details contained in at least some of the fields into the set of features; and
    wherein the playbook generation system transforms the details into features using Boolean encoding for fields having a type that is Boolean by nature or that represents presence verses absence, and using one hot encoding for fields having a type that contains a finite set of possible values.

2. A method in accordance with claim 1, wherein the at least some of the fields includes a field defining a category of the new cybersecurity incident and at last one filed containing details other than a category of the new cybersecurity incident.

3. A method in accordance with claim 1, wherein the fields are Common Event Format fields.

4. A method in accordance with claim 1, wherein the playbook generation system localizes the set or subset of nearest neighbors of the new cybersecurity incident by measuring the distance of the other cybersecurity incidents from the new cybersecurity incident according to a metric applied to the set of features of the other cybersecurity incidents.

5. A method in accordance with claim 4, wherein the metric applied to the set of features is computed as an average of weighted feature values.

6. A method in accordance with claim 5, wherein the feature values are weighted according to user-settable weights having a numerical value corresponding to relative importance of each feature in the set of features.

7. A method in accordance with claim 1, wherein the set or subset of nearest neighbors of the new cybersecurity incident has a predefined cardinality K and the playbook generation system localizes K nearest neighbors of the new cybersecurity incident.

8. A method in accordance with claim 1, wherein the set or subset of nearest neighbors of the new cybersecurity incident has a predefined cardinality K, and if the playbook generation system cannot localize K nearest neighbors of the new cybersecurity incident, but one or more incidents in the feature space are identical to the new cybersecurity incident, then the playbook generation system localizes the one or more identical incidents as the set or subset of nearest neighbors.

9. A method in accordance with claim 1, wherein the playbook generation system selects the one or more prescriptive procedures for responding to the new cybersecurity incident based on a relevance of each of the nearest neighbors with respect to the new cybersecurity incident, the relevance being dependent upon the distances of the nearest neighbors from the new cybersecurity incident and the ages of the nearest neighbors.

10. A method in accordance with claim 9, wherein the relevance of each of the nearest neighbors depends upon the distances and the ages according to a user-settable parameter that specifies relative weight given to distance and to age.

11. A method in accordance with claim 1, wherein the playbook generation system selects the one or more prescriptive procedures in accordance with a score based upon a relevance of each of the nearest neighbors with respect to the new cybersecurity incident, the relevance being dependent upon the distances of the nearest neighbors from the new cybersecurity incident, and based on whether each of the one or more prescriptive procedures was committed in response to each of the nearest neighbors.

12. A method in accordance with claim 11, wherein the playbook generation system generates a plurality of custom playbooks, which are presented to the user of the security incident response platform, the plurality of custom playbooks corresponding to a respective plurality of score thresholds and each of the custom playbooks having one or more prescriptive procedures selected in accordance with whether the score associated with each prescriptive procedure exceeds one of the score thresholds corresponding to the custom playbook.

13. A method in accordance with claim 1, further comprising, at the playbook generation system, recording the new cybersecurity incident in the feature space and automatically tying to the new cybersecurity incident the one or more prescriptive procedures initiated by the user in responding to the new cybersecurity incident, thereby automatically affecting subsequent recommendations of playbooks for responding to cybersecurity incidents having features similar or identical to the set of features of the new cybersecurity incident.

14. A method in accordance with claim 1, wherein the set or subset of nearest neighbors comprises a set all neighbors nearest to the new cybersecurity incident in the feature space.

15. An apparatus for responding to cybersecurity incidents, comprising:
    a computerized processing system; and
    a visual display system;
wherein the computerized processing system is programmed with a security incident response platform and a playbook generation system;
the security incident response platform being programmed to register a new cybersecurity incident;
the playbook generation system being programmed to:
    receive details of the new cybersecurity incident from the security incident response platform, at least some of the details corresponding to a set of features of the new cybersecurity incident;
    localize a set or subset of nearest neighbors of the new cybersecurity incident in a feature space, the nearest neighbors of the new cybersecurity incident being other cybersecurity incidents having a distance from the new cybersecurity incident within the feature space that is defined by differences in features of the nearest neighbors with respect to the set of features of the new cybersecurity incident; and
    create a custom playbook for responding to the new cybersecurity incident, the custom playbook having one or more prescriptive procedures, for responding to the new cybersecurity incident registered by the security incident response platform, that are based on occurrences of prescriptive procedures previously employed in response to the nearest neighbor cybersecurity incidents, and on distances of the nearest neighbors of the new cybersecurity incident in the feature space;
the security incident response platform being programmed to:
    present to a user of the security incident response platform, through the visual display system, the custom playbook containing the one or more prescriptive procedures for responding to the new cybersecurity incident; and
    permit the user of the security incident response platform to initiate the one or more prescriptive procedures contained in the custom playbook to respond to the new cybersecurity incident;
wherein the details of the new cybersecurity incident are contained in fields of a log record, and the playbook generation system is programmed to transform the details contained in at least some of the fields into the set of features; and
wherein the playbook generation system is programmed to transform the details into features using Boolean encoding for fields having a type that is Boolean by nature or that represents presence verses absence, and using one hot encoding for fields having a type that contains a finite set of possible values.

16. A computer-readable, non-transitory, tangible medium comprising software that, when executed by a processor, causes the processor to perform a method of responding to cybersecurity incidents, comprising:
    at a security incident response platform, registering a new cybersecurity incident;
    at a playbook generation system:
        receiving details of the new cybersecurity incident from the security incident response platform, at least some of the details corresponding to a set of features of the new cybersecurity incident;
        localizing a set or subset of nearest neighbors of the new cybersecurity incident in a feature space, the nearest neighbors of the new cybersecurity incident being other cybersecurity incidents having a distance from the new cybersecurity incident within the feature space that is defined by differences in features of the nearest neighbors with respect to the set of features of the new cybersecurity incident; and
        creating a custom playbook for responding to the new cybersecurity incident, the custom playbook having one or more prescriptive procedures, for responding to the new cybersecurity incident registered by the security incident response platform, that are based on occurrences of prescriptive procedures previously employed in response to the nearest neighbor cybersecurity incidents, and on distances of the nearest neighbors of the new cybersecurity incident in the feature space;
        presenting to a user of the security incident response platform the custom playbook containing the one or more prescriptive procedures for responding to the new cybersecurity incident;
        permitting the user of the security incident response platform to initiate the one or more prescriptive procedures contained in the custom playbook to respond to the new cybersecurity incident;
    wherein the details of the new cybersecurity incident are contained in fields of a log record, and the playbook generation system transforms the details contained in at least some of the fields into the set of features; and
    wherein the playbook generation system transforms the details into features using Boolean encoding for fields having a type that is Boolean by nature or that represents presence verses absence, and using one hot encoding for fields having a type that contains a finite set of possible values.

17. A method of responding to cybersecurity incidents, comprising:
- at a security incident response platform, registering a new cybersecurity incident;
- at a playbook generation system:
  - receiving details of the new cybersecurity incident from the security incident response platform, at least some of the details corresponding to a set of features of the new cybersecurity incident; and
  - producing a playbook for responding to the new cybersecurity incident, the playbook having one or more prescriptive procedures, for responding to the new cybersecurity incident, that are based on occurrences of one or more prescriptive procedures previously employed in response to previous cybersecurity incidents recorded in a feature space having features similar or identical to the set of features of the new cybersecurity incident;
- presenting to a user of the security incident response platform the playbook containing a set of the one or more prescriptive procedures for responding to the cybersecurity incident;
- the user of the security incident response platform responding to the cybersecurity incident by initiating a set of one or more prescriptive procedures that differs from the set of the one or more prescriptive procedures contained in the playbook; and
- at the playbook gene ration system, recording the new cybersecurity incident in the feature space and automatically tying to the new cybersecurity incident the one or more prescriptive procedures actually initiated by the user in responding to the new cybersecurity incident, thereby automatically altering subsequent recommendations of playbooks for responding to cybersecurity incidents having features similar or identical to the set of features of the new cybersecurity incident;
- wherein the playbook generation system causes the one or more additional prescriptive procedures to be flagged when the set of one or more prescriptive procedures actually initiated by the user differs from the set of the one or more prescriptive procedures contained in the playbook presented to the user in that the set of one or more prescriptive procedures actually initiated by the user adds one or more additional prescriptive procedures, so that the additional prescriptive procedures will always be included in the subsequent recommendations of playbooks for responding to cybersecurity incidents having features similar or identical to the set of features of the new cybersecurity incident.

18. A method in accordance with claim 17, wherein the set of one or more prescriptive procedures actually initiated by the user differs from the set of the one or more prescriptive procedures contained in the playbook presented to the user in that the one or more prescriptive procedures actually initiated by the user are picked by the user from a playbook different from the playbook presented to the user.

19. A method in accordance with claim 17, wherein the set of one or more prescriptive procedures actually initiated by the user differs from the set of the one or more prescriptive procedures contained in the playbook presented to the user in that the set of one or more prescriptive procedures actually initiated by the user removes one or more of the prescriptive procedures contained in the playbook presented to the user.

20. An apparatus for responding to cybersecurity incidents, comprising:
- a computerized processing system; and
- a visual display system;
- wherein the computerized processing system is programmed with a security incident response platform and a playbook generation system;
- the security incident response platform being programmed to register a new cybersecurity incident;
- the playbook generation system being programmed to:
  - receive details of the new cybersecurity incident from the security incident response platform, at least some of the details corresponding to a set of features of the new cybersecurity incident; and
  - produce a playbook for responding to the new cybersecurity incident, the playbook having one or more prescriptive procedures, for responding to the new cybersecurity incident, that are based on occurrences of one or more prescriptive procedures previously employed in response to previous cybersecurity incidents recorded in a feature space having features similar or identical to the set of features of the new cybersecurity incident;
- the security incident response platform being programmed to:
  - present to a user of the security incident response platform, through the visual display system, the playbook containing a set of the one or more prescriptive procedures for responding to the cybersecurity incident; and
  - permit the user of the security incident response platform to respond to the new cybersecurity incident by initiating a set of one or more prescriptive procedures that differs from the set of the one or more prescriptive procedures contained in the playbook;
- the playbook generation system being programmed to record the new cybersecurity incident in the feature space and automatically tie to the new cybersecurity incident the one or more prescriptive procedures actually initiated by the user in responding to the new cybersecurity incident, the re by automatically altering subsequent recommendations of playbooks for responding to cybersecurity incidents having features similar or identical to the set of features of the new cybersecurity incident; and
- the playbook generation system being programmed to cause the one or more additional prescriptive procedures to be flagged when the set of one or more prescriptive procedures actually initiated by the user differs from the set of the one or more prescriptive procedures contained in the playbook presented to the user in that the set of one or more prescriptive procedures actually initiated by the user adds one or more additional prescriptive procedures, so that the additional prescriptive procedures will always be included in the subsequent recommendations of playbooks for responding to cybersecurity incidents having features similar or identical to the set of features of the new cybersecurity incident.

21. A computer-readable, non-transitory, tangible medium comprising software that, when executed by a processor, causes the processor to perform a method of responding to cybersecurity incidents, comprising:
- at a security incident response platform, registering a new cybersecurity incident;
- at a playbook generation system:
  - receiving details of the new cybersecurity incident from the security incident response platform, at least some of the details corresponding to a set of features of the new cybersecurity incident; and
  - producing a playbook for responding to the new cybersecurity incident, the playbook having one or more prescriptive procedures, for responding to the new cybersecurity incident, that are based on occurrences of one or more prescriptive procedures previously employed in response to previous cybersecurity incidents recorded in a feature space having features similar or identical to the set of features of the new cybersecurity incident;

presenting to a user of the security incident response platform the playbook containing a set of the one or more prescriptive procedures for responding to the cybersecurity incident;

permitting the user of the security incident response platform to respond to the cybersecurity incident by initiating a set of one or more prescriptive procedures that differs from the set of the one or more prescriptive procedures contained in the playbook; and at the playbook gene ration system, recording the new cybersecurity incident in the feature space and automatically tying to the new cybersecurity incident the one or more prescriptive procedures actually initiated by the user in responding to the new cybersecurity incident, thereby automatically altering subsequent recommendations of playbooks for responding to cybersecurity incidents having features similar or identical to the set of features of the new cybersecurity incident;

wherein the playbook generation system causes the one or more additional prescriptive procedures to be flagged when the set of one or more prescriptive procedures actually initiated by the user differs from the set of the one or more prescriptive procedures contained in the playbook presented to the user in that the set of one or more prescriptive procedures actually initiated by the user adds one or more additional prescriptive procedures, so that the additional prescriptive procedures will always be included in the subsequent recommendations of playbooks for responding to cybersecurity incidents having features similar or identical to the set of features of the new cybersecurity incident.

22. A method of responding to cybersecurity incidents, comprising:

at a security incident response platform, registering a new cybersecurity incident;

at a playbook generation system:
receiving details of the new cybersecurity incident from the security incident response platform, at least some of the details corresponding to a set of features of the new cybersecurity incident;

localizing a set or subset of nearest neighbors of the new cybersecurity incident in a feature space, the nearest neighbors of the new cybersecurity incident being other cybersecurity incidents having a distance from the new cybersecurity incident within the feature space that is defined by differences in features of the nearest neighbors with respect to the set of features of the new cybersecurity incident; and creating a custom playbook for responding to the new cybersecurity incident, the custom playbook having one or more prescriptive procedures, for responding to the new cybersecurity incident registered by the security incident response platform, that are based on occurrences of prescriptive procedures previously employed in response to the nearest neighbor cybersecurity incidents, and on distances of the nearest neighbors of the new cybersecurity incident in the feature space;

presenting to a user of the security incident response platform the custom playbook containing the one or more prescriptive procedures for responding to the new cybersecurity incident;

the user of the security incident response platform initiating the one or more prescriptive procedures contained in the custom playbook to respond to the new cybersecurity incident;

wherein the set or subset of nearest neighbors of the new cybersecurity incident has a predefined cardinality K, and if the playbook generation system localizes K nearest neighbors of the new cybersecurity incident that are identical to the new cybersecurity incident, the playbook generation system localizes as the set or subset of nearest neighbors a subset of the K nearest neighbors that are identical to the new cybersecurity incident, each nearest neighbor in the subset of the K nearest neighbors having a unique playbook, and the playbook generation system searches for more distant neighbors of the new cybersecurity incident for inclusion in the set or subset of nearest neighbors.

23. An apparatus for responding to cybersecurity incidents, comprising:
a computerized processing system; and
a visual display system;
wherein the computerized processing system is programmed with a security incident response platform and a playbook generation system;
the security incident response platform being programmed to register a new cybersecurity incident;
the playbook generation system being programmed to:
receive details of the new cybersecurity incident from the security incident response platform, at least some of the details corresponding to a set of features of the new cybersecurity incident;
localize a set or subset of nearest neighbors of the new cybersecurity incident in a feature space, the nearest neighbors of the new cybersecurity incident being other cybersecurity incidents having a distance from the new cybersecurity incident within the feature space that is defined by differences in features of the nearest neighbors with respect to the set of features of the new cybersecurity incident; and
create a custom playbook for responding to the new cybersecurity incident, the custom playbook having one or more prescriptive procedures, for responding to the new cybersecurity incident registered by the security incident response platform, that are based on occurrences of prescriptive procedures previously employed in response to the nearest neighbor cybersecurity incidents, and on distances of the nearest neighbors of the new cybersecurity incident in the feature space;
the security incident response platform being programmed to:
present to a user of the security incident response platform, through the visual display system, the custom playbook containing the one or more prescriptive procedures for responding to the new cybersecurity incident; and
permit the user of the security incident response platform to initiate the one or more prescriptive procedures contained in the custom playbook to respond to the new cybersecurity incident;
wherein the set or subset of nearest neighbors of the new cybersecurity incident has a predefined cardinality K, and if the playbook generation system localizes K nearest neighbors of the new cybersecurity incident that are identical to the new cybersecurity incident, the playbook generation system is programmed to localize as the set or subset of nearest neighbors a subset of the K nearest neighbors that are identical to the new cybersecurity incident, each nearest neighbor in the subset of the K nearest neighbors having a unique playbook, and the playbook generation system is programmed to search for more distant neighbors of the new cybersecurity incident for inclusion in the set or subset of nearest neighbors.

24. A computer-readable, non-transitory, tangible medium comprising software that, when executed by a processor, causes the processor to perform a method of responding to cybersecurity incidents, comprising:

at a security incident response platform, registering a new cybersecurity incident;
 at a playbook generation system:
  receiving details of the new cybersecurity incident from the security incident response platform, at least some of the details corresponding to a set of features of the new cybersecurity incident;
  localizing a set or subset of nearest neighbors of the new cybersecurity incident in a feature space, the nearest neighbors of the new cybersecurity incident being other cybersecurity incidents having a distance from the new cybersecurity incident within the feature space that is defined by differences in features of the nearest neighbors with respect to the set of features of the new cybersecurity incident; and
  creating a custom playbook for responding to the new cybersecurity incident, the custom playbook having one or more prescriptive procedures, for responding to the new cybersecurity incident registered by the security incident response platform, that are based on occurrences of prescriptive procedures previously employed in response to the nearest neighbor cybersecurity incidents, and on distances of the nearest neighbors of the new cybersecurity incident in the feature space;
 presenting to a user of the security incident response platform the custom playbook containing the one or more prescriptive procedures for responding to the new cybersecurity incident; and
 permitting the user of the security incident response platform to initiate the one or more prescriptive procedures contained in the custom playbook to respond to the new cybersecurity incident;
 wherein the set or subset of nearest neighbors of the new cybersecurity incident has a predefined cardinality K, and if the playbook generation system localizes K nearest neighbors of the new cybersecurity incident that are identical to the new cybersecurity incident, the playbook generation system localizes as the set or subset of nearest neighbors a subset of the K nearest neighbors that are identical to the new cybersecurity incident, each nearest neighbor in the subset of the K nearest neighbors having a unique playbook, and the playbook generation system searches for more distant neighbors of the new cybersecurity incident for inclusion in the set or subset of nearest neighbors.

* * * * *